Oct. 25, 1966 T. J. MISBIN 3,281,147
ADJUSTABLE SIZE DOCUMENT STACKER
Filed Feb. 4, 1965 2 Sheets-Sheet 1
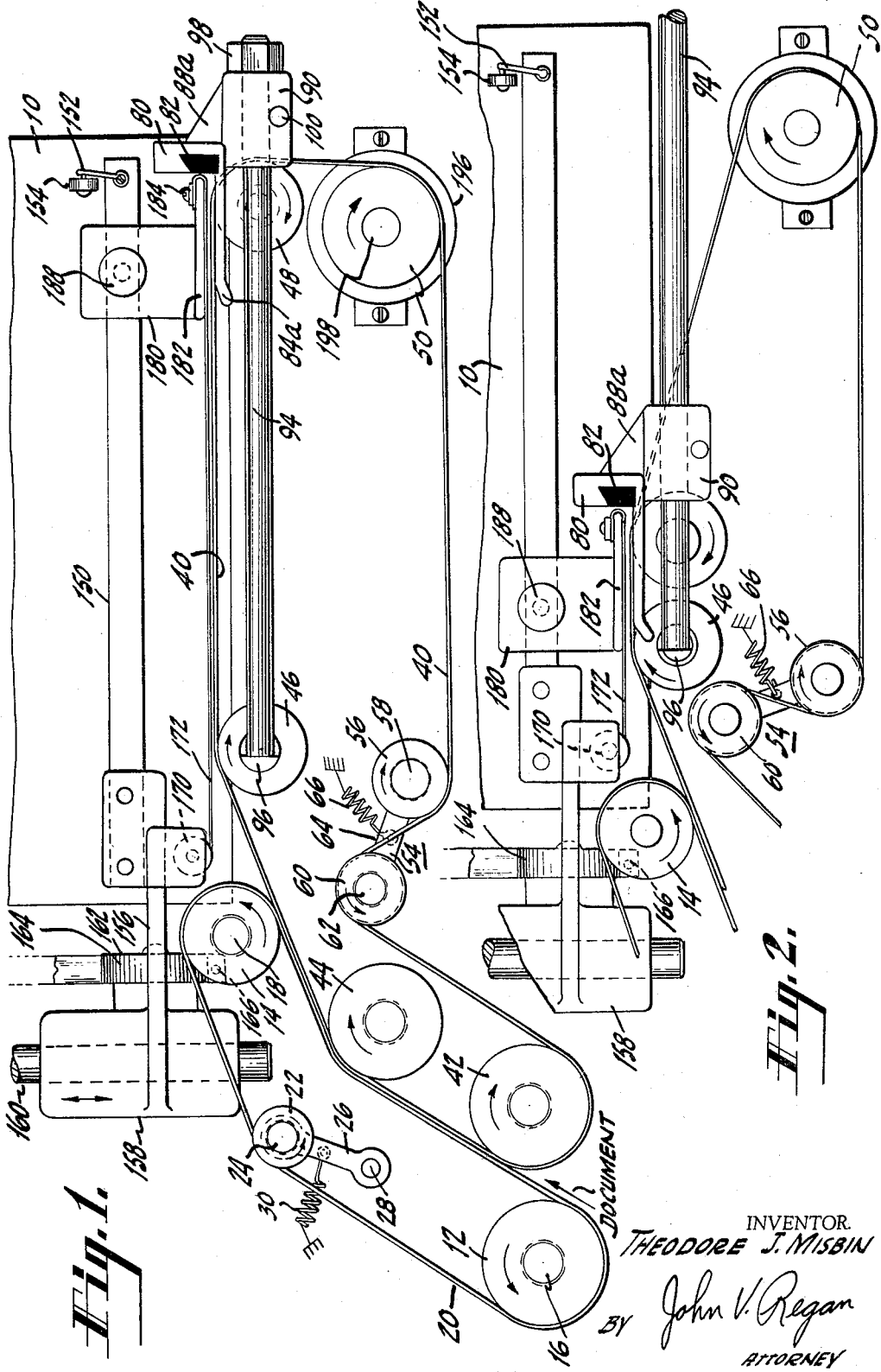
INVENTOR.
THEODORE J. MISBIN
BY John V. Regan
ATTORNEY Oct. 25, 1966     T. J. MISBIN     3,281,147
ADJUSTABLE SIZE DOCUMENT STACKER
Filed Feb. 4, 1965     2 Sheets-Sheet 2
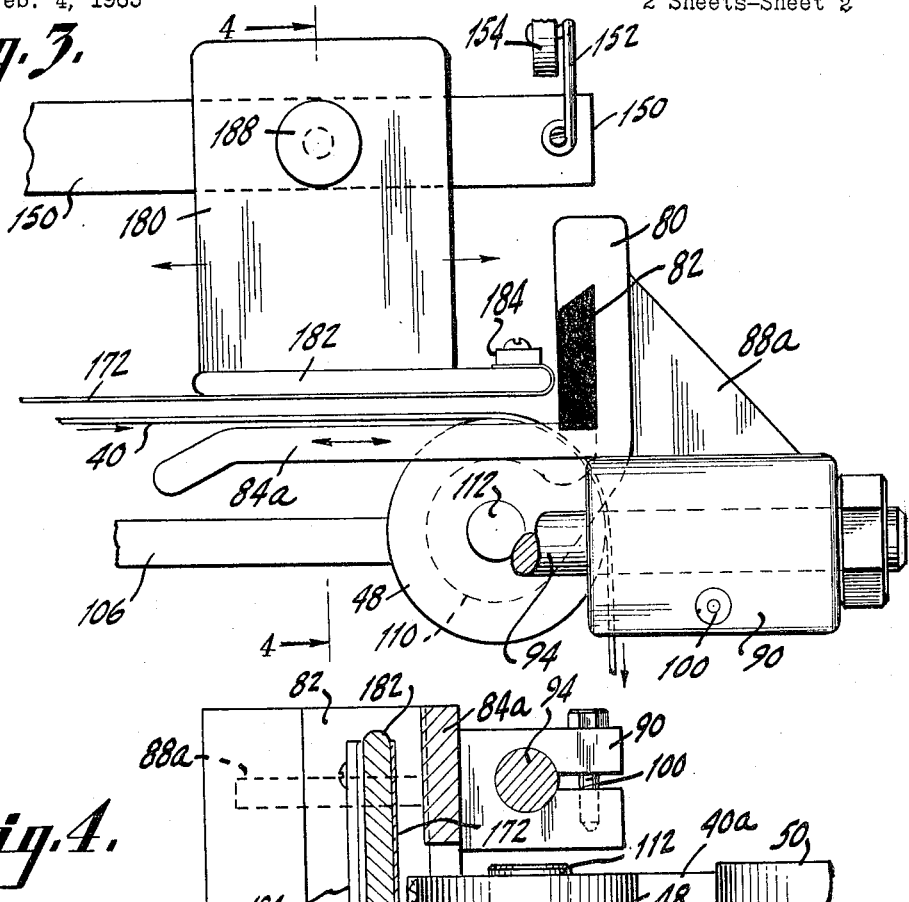
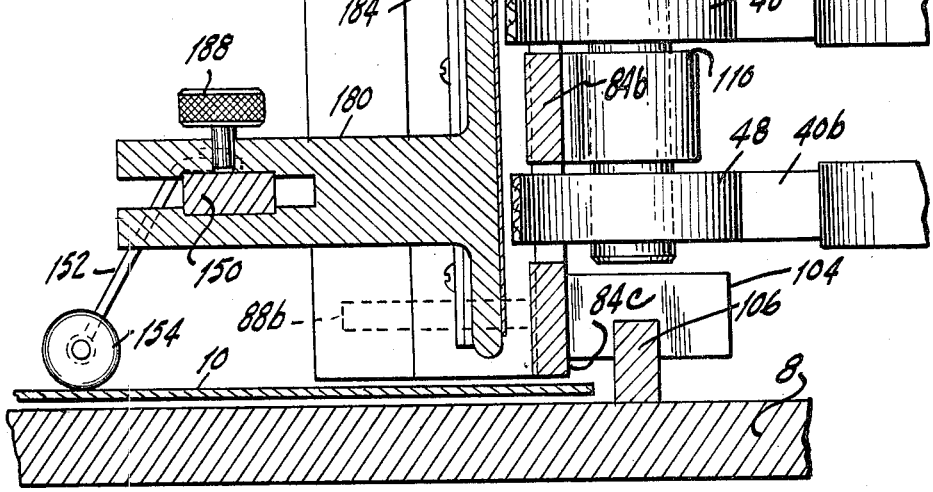
INVENTOR.
THEODORE J. MISBIN
BY John V. Regan
Attorney 3,281,147
ADJUSTABLE SIZE DOCUMENT STACKER
Theodore J. Misbin, Cherry Hill, N.J., assignor to Radio
Corporation of America, a corporation of Delaware
Filed Feb. 4, 1965, Ser. No. 430,351
12 Claims. (Cl. 271—87)

This invention relates to document handling apparatus and, in particular, to a document stacker which is adjustable in size to accommodate documents of different lengths.

In a stacker for receiving and stacking documents in an upright position, moving belts at the forward end of the stacking area may drive each incoming document against a side wall or other member in the stacker which serves as a stop member to arrest the document. The incoming document is biased into engagement with the belts by means of a movable backing member urged toward the belts. In general, the arresting surface of the stop member comprises an elastomeric material to protect the leading edges of the documents by absorbing the impact. In order to permit adjustment of the stacking area to conform to the document length in the batch of documents being processed, the position of the stop member may be made adjustable for movment along the path of document travel.

In known prior art devices of this general type, notches are provided in the movable stop member. The drive belts extend through these notches to respective pulleys or rollers located beyond the furthermost position of the stop member. These notches permit the stop member to be moved along the path of document travel so as to accommodate documents of different length. However, the notches prevent the stop member from applying arresting force along the entire leading edge of a document. Deforming stresses are thereby set up in the document, particularly at points corresponding to the sides of the notches. These deforming stresses may be sufficient to damage the document, especially when the documents are processed repetitively.

It is one object of this invention to provide an improved document handling device for receiving and stacking documents in an upright position, the device being adjustable to accommodate documents of different lengths.

It is another object of this invention to provide an adjustable document stacker wherein the arresting surface of the stop member has no notches.

It is still another object of this invention to provide a document stacker having an adjustable stop member which applies an arresting force along the entire leading edge of each incoming document.

It is a further object of this invention to provide an improved stacker backing member which is adjustable in length.

It is yet another object of this invention to provide an improved document stacker in which the position of the stop member and the length of the backing member are adjustable in accordance with the length of document being processed.

In a document stacker embodying the invention, the adjustable stop member is located, in the direction of document travel, beyond the points of tangency of the belts with the respective rollers in the last set of rollers along the feed path. These rollers are mounted on a shaft which is constrained to translate with the stop member, whereby the rollers and stop member always have the same relative position with respect to one another. The belts exit from the stacking area in the region between these rollers and the forward edge of the stop member, rather than extending through notches in the stop member, as in the prior art. The forward edge of the stop member is located forwardly of the plane of the incoming document, whereby the entire leading edge of the document may strike the stop member.

The movable backing member also is made adjustable in length to conform to the document length. This backing member preferably comprises an elongated member parallel to the stacker front and carrying an upright roller. A web of flexible material has one end secured to the roller, and the roller is biased in a manner tending to cause the web to wind around the roller. The other end of the web is secured to an element which is slideably mounted on the elongated member.

In the accompanying drawing, like reference characters designate like components throughout the several views, and:

FIGURE 1 is a plan view of the front end of the stacker and the belt arrangement, with the stop member-roller assembly and backing member positioned for accommodating documents of maximum allowable length;

FIGURE 2 is a plan view similar to FIGURE 1, but with the stop member-roller assembly and backing member positioned for handling documents of essentially minimum allowable length;

FIGURE 3 is an expanded plan view of the stop member-roller assembly and backing member illustrating the details thereof; and FIGURE 4 is a view in side elevation, partially in section, taken along the lines 4—4 of FIGURE 3.

Referring now to FIGURE 1, there is shown in plan view the front end of the document stacker and associated components, and a belt arrangement for transporting incoming documents in an upright position to and into the stacker. A first part of the transport means includes two sets of rollers 12, 14 mounted on upright shafts 16, 18, respectively. Preferably, each set includes two rollers mounted one above the other on the same shaft. The shafts may be secured in a stationary position to a base member 8 (FIGURE 4) which is common to the system, and the rollers may rotate in bearings which are press-fitted on the shafts. One or more sets of endless belts 20 are carried by the rollers 12, 14. A third, spring-loaded idler roller, or rollers 22 urges the belts 20 in an outward direction to maintain proper belt tension. The idler rollers 22 are mounted on a shaft 24 carried by an arm 26. Arm 26 is pivotally mounted on a pin 28 secured to the common base, and the arm 26 is biased by means of a spring 30 in a direction to force the rollers 22 against the inner surfaces of the belts 20.

The other part of the transport means includes a second set of belts 40 in engagement with several sets of rollers 42, 44, 46, 48, and 50. As illustrated more clearly in FIGURE 4, each set may comprise two rollers, each carrying a different belt 40a, 40b. A spring-loaded idler assembly 54 maintains substantially constant tension in the belts 40. Idler assembly 54 comprises a first set of rollers 56 contacting the belts 40 and being rotatably mounted in bearings on a pivot shaft 58. A second set of rollers 60 is rotatably mounted on a shaft 62 which is supported by an arm 64. Arm 64 is pivotable about the shaft 58. A spring 66 is fastened at one end to a fixed point, shown by the conventional symbol for ground, and is connected at its other end to the arm 64. Spring 66 urges arm 64 and shaft 62 in a clockwise direction about the pivot shaft 58 to maintain tension in the belts 40 and to take up any slack therein.

The stacker includes a platform 10 or bottom stacker plate which may be elevated above the common base 8 (FIGURE 4). Only the front end of the stacker plate is illustrated in the drawing. Roller sets 46 and 48 are positioned at the front end of the document stacking area. That portion of the belts 40 between the rollers 46 and 48 extends across at least a portion of the front end of the stacker and may serve as the front wall of the stacker. Located at the forward right side of the stacker, as viewed in FIGURE 1, is an adjustable assembly which includes a stop member 80 for arresting the documents fed into the stacker by the belts 40. Details of this assembly are better seen in FIGURES 3 and 4.

The assembly comprises an upright stop member 80 having a height equal to or greater than that of the documents to be stacked. Stop member 80 has an insert 82 of elastomeric material which extends throughout the height of the stop member 80 and which serves as the arresting surface for the incoming documents. The elastomeric material serves to cushion the impact of the incoming document with the stop member. Projecting horizontally from the stop member 80, at the forward end thereof, is a set of fingers 84a, 84b, and 84c which extend parallel to that portion of the belts 40 between rollers 46 and 48. The fingers 84a, 84b, and 84c are curved forwardly at their free ends, for purposes to be described hereinafter.

Rigidly attached to the stop member 80 by means of a triangularly shaped member 88a is a carriage-like member 90, best seen in FIGURE 4, which is slideably mounted on a rod 94. Rod 94 is supported at its left-hand end atop the shaft 96 about which rollers 46 rotate, and is supported at its right-hand end by an upright post 98 mounted on the common base. Rod 94 is parallel to the front end of the common base. That is to say, rod 94 is parallel to that portion of the belts 40 between the rollers 46 and 48. Carriage member 90 is bifurcated at its forward end, and may be clamped in an immovable position on rod 94 by tightening a screw 100 to reduce the gap between the bifurcated ends.

A second carriage-like member 104 is rigidly attached at the bottom of the stop member 90 by means of a triangular support 88b (FIGURE 4). Member 104 is slideably mounted on a rail 106. Rail 106 and rod 94 limit the stop member assembly to movement in a direction parallel to the front end of the stacker.

Also rigidly attached at the forward end of stop member 80, and forming an integral part of the same assembly, is a shaft support or housing 110 (FIGURES 3 and 4) which supports the shaft 112 on which rollers 48 are mounted. Shaft support 110 has a bore for receiving the shaft 112, and the shaft may be rotatable in bearings in the support 110. For example, the outer race of a bearing may be press-fitted into the bore of the support 110 and the inner race of the bearing may be press-fitted onto the shaft 112. Because of the support member 110, the stop member 80 and rollers 48 are constrained to translate together. The rollers 48 thus always have the same relative position with respect to the stop member 80 and insert 82 regardless of the position of the carriage members 90 and 104 along the respective rod 94 and guide rail 106. In practice, the stop member 80, carriage members 90 and 104 and shaft support 110 may be a unitary, integral assembly.

It will be noted that the stop member 80 is located, in the direction of document travel, beyond the point of horizontal tangency of a belt 40 with its respective roller 48. The belts 40, beyond the point of tangency, leave the stacking area at a point short of the stop member 80, and exit from the stacking area in the region between the rollers 48 and the elastomeric insert 82. For this reason, it is unnecessary to provide notches in the stop member through which the belts 40 extend, as is the case in the prior art arrangement. It will also be noted (FIGURE 3) that the forward edge (or lower end as viewed in the drawing) of the elastomeric insert 82 is forward of the horizontal plane of the outer belt 40 surface. That is to say, a horizontal line tangent to the outer surface of the belt 40 at the front end of the stacker intersects the elastomeric insert 82 at a point between its forward and rear edges, whereby the entire leading edge of the incoming document, driven against the insert 82 by the belts 40, may strike the elastomeric insert 82. Since there are no notches in the insert 82, harmful deforming stresses of the type previously mentioned are avoided in the document. Projecting fingers 84a, 84b, and 84c among other functions, prevent the lead end of an incoming document from following the belts around the rollers 48 in the area of belt exit. Also, the forward end of the elastomeric insert 82 is forward of the rear surfaces of the projecting fingers 84a, 84b, and 84c whereby the leading edge of the document must strike the elastomeric insert 82.

The stacker also has a movable backing assembly which is adjustable in length to conform to the position of the stop member assembly. The assembly comprises an elongated member or rail 150 which is rigidly coupled at its left end to a horizontal arm 156 (FIGURE 1). Arm 156 is an integral part of a cylindrical housing 158 which is slideably mounted on a shaft 160 extending from the front to the rear of the stacker. Arm 156 holds the elongated member 150 in a position parallel to the front of the stacker and elevated above the stacker plate 10 (FIGURE 4). The right end of the elongated member 150 is supported by an arm 152 which is pinned to a roller 154. Roller 154 rides on the stacker plate 10 (FIGURE 4).

Pinned to the cylindrical housing 158, on the stacker side thereof, is a spool 162 which rides on the common base. A ribbon spring 164 is wound around the spool 162 and has its free end secured to the base by a pin 166 at the forward end of the stacker. Tension in the spring 164 operates to bias the entire backing assembly in a forward direction toward the belts 40 and rollers 46 and 48.

A roller or spool 170 (FIGURES 1 and 2) is constrained to move with the elongated member 150, and is supported with its axis in an upright position. A web 172 or length of flexible material, such as a very thin sheet of metal, is secured at one end to the roller 170. Roller 170 is urged or biased for rotation in a clockwise direction tending to cause the web 172 to roll up on the roller. In particular, the roller 170 may be spring loaded, and preferably may have the same general construction as the conventional window shade roller. For example, the roller "shaft" may include a coiled spring acting to rotate the roller 170 in a clockwise direction.

Slideably mounted on elongated member 150 is an element 180 which is bifurcated at its back end and which terminates at its forward end in an upright plate 182 (FIGURE 4). The bifurcated fingers capture the elongated member 150 and may be clamped unmovably thereon by means of an adjustable thumbscrew 188. The free end portion of the web 172 engages the forward surface of the upright plate 182 and is curved around the right end thereof. The free end of the web is secured or clamped at the back side of the plate 182 by a clamp member 184. The front surface of the plate 182 and the leading edge of the roller 170 lie substantially in the same plane whereby the web 172, which serves as the backing member of the stacker, is parallel to the stacker front.

In FIGURES 1 and 3, both the stop member 80-roller 48 assembly and the backing member are positioned for handling documents of maximum allowable length. The stop member-roller assembly is moved to this position by loosening the screw 100 on the upper carriage member 90 and sliding the assembly along rod 94 and guide rail 106 to the far right position indicated. When the assembly is in this position, the distance between the rollers 46 and the stop member 80 is a maximum. The backing member is adjusted for maximum length by loosening the thumbscrew 188 (FIGURE 4) and sliding the arm 180 along the elongated member 150 to a position whereat the right edge of the vertical plate 182 is closely adjacent the left side of the stop member 80. Both of the thumbscrews 100 and 188 are then tightened to prevent further movement of tthe assemblies.

Both of these assemblies are illustrated in FIGURE 2 in the proper position for accommodating documents of approximately minimum allowable length. The stop member 80-roller assembly is moved to this position by loosening the thumbscrew 100 and sliding the assembly to the left to the position shown. As this assembly is moved to the left, the angle of the belts 40 between the rollers 48 and 50 changes. However, the belt 40 still leaves the rollers 48 and exits from the stacking area in the region between the rollers 48 and the arresting surface 82 of the stop member. Also, moving the rollers 48 to the left has the effect of tending to reduce the total path length traveled by the belts 40, whereby the belts would become slack in the absence of the spring-loaded idler assembly 54. However, this idler assembly takes up the slack in the belts and maintains substantially constant tension therein in the manner previously described. Note in FIGURE 2 that the assembly has rotated about 30 degrees clockwise as compared with the position in FIGURE 1.

The backing member may be adjusted for minimum document length by loosening the thumbscrew 188 and sliding arm 180 to the left. As the arm 180 moves to the left, the bias on the roller 170 causes the roller to rotate in a clockwise direction and wind up the excess portion of the web 172, whereby the web is held taut.

Consider now the operation of the system. Documents are fed in an upright position (by means not shown) into the nip between belts 20 and 40. Belt 40 is driven continuously in a clockwise direction. For example, this may be accomplished by driving the roller 50 from a motor element 196 located beneath the base. Alternatively, the element 196 could be a pulley fixedly attached to the shaft 198 and driven by external means (not shown). The two belts 20, 40, in the region between rollers 14 and 42 are in contact with one another, whereby belt 40 operates to drive belt 20 by friction. The incoming document is fed between the two belts, and is carried thereby in an upright position into the entrance or inlet area of the stacker at the left of the roller 46.

As the document first enters the stacking area, it is directed at an acute angle toward the web, or backing member 172. The web serves to deflect the leading edge of the document to the right and into contact with the belt 40 portion between rollers 46 and 48. The backing member is urged, by spring 164, in a forward direction, into contact with the belts 40 when there are no documents in the stacker and, in turn, biases the first incoming document against the belts 40. When there are already documents in the stacker, the backing member, urged in a forward direction, biases the stacked documents in the forward direction so that the forwardmost document in the stacker is biased against the belts. The stop member 80-roller 48 assembly is so positioned that, for the batch of documents being handled, the trailing edge of a stacked document is located to the left of rollers 46 when the forward edge of the document is against the stop member 80. Accordingly, the forwardmost document in the stacker then serves to deflect the incoming document and bias it against the belts 40.

The incoming document is driven along the forward end of the stacker by the belts 40 and into engagement with the elastomeric insert 82 in the stop member 80. The elastomeric material, as previously mentioned, serves to protect the document from damage by absorbing the shock on impact. Because the plane of the belts 40 at the forward end of the stacker intersects the insert 82 along a line intermediate the forward and rear edges thereof, the entire leading edge of the incoming document may strike the insert 82 with uniform force.

The backing member translates toward the rear of the stacker as documents are fed into the stacker, and the ribbon spring unwinds from the spool 162 as the backing member translates to the rear. The action of the spring 164, however, always operates to urge the backing member and the documents in the stacker to the forwardmost position. In the various views, a slight space is shown between the web 172 and the belts 40 for purposes of clarity of drawing. It will be understood, however, that in actual practice, the belts 40 are in engagement with the backing member 172 when there are no documents in the stacker.

When the pack of documents in the stacker becomes large, the force of the documents pressing against the belts 40 may tend to press the belts 40 in a forward direction (toward shaft 94 for example). The fingers 84a, 84b, and 84c, extending from the stop member 80 assembly, then serve to guide the documents along the desired path as they approach the stop member. The curved ends of the fingers serve to deflect the document in toward the rear of the stacker in that case and the documents are thereafter driven along the rear, flat portions of the fingers 84a, 84b, and 84c to the stop member.

What is claimed is:

1. In a document holding device having a front and means for feeding documents in an upright position along said front, adjustable document back-up means comprising:
   a member movable in a direction normal to the front of the holding device;
   a roller movable with said member and having a length of flexible material wound thereon;
   an element slideably mounted on said member for movement toward and away from said roller; and
   means for securing one end of said flexible material to said element.

2. In a document stacker having a front wall and means for feeding documents in an upright position along said wall, an adjustable document back-up means forming the back wall of said stacker and being movable toward and way from said front wall, said back-up means comprising:
   a member substantially parallel to said front wall and movable in a direction normal thereto;
   a roller constrained to move with said member and having its axis in said upright position;
   a web of flexible material having one end connected to said roller;
   means biasing said roller in a direction to cause said material to wind around said roller;
   an element slideably mounted on said member and being adjustably movable toward and away from said roller; and
   means for securing the other end of said material to said element.

3. The combinatiton as claimed in claim 2, wherein said material has the form of a thin sheet, and including means for clamping said element in a desired position relative to said member.

4. The combination as claimed in claim 3, wherein the portion of said sheet between said roller and said element is substantially parallel to said front wall.

5. In a document hopper, an adjustable hopper wall comprising:
   an elongated member parallel to said wall;
   a roller affixed to said member and having its axis in a plane parallel to the wall;
   a web of flexible material having one end portion attached to said roller;
   means biasing said roller in a direction to cause said material to roll up on said roller;
   an element slideably mounted on said elongated member and being movable toward and away from said roller; and means for securing the other end of said material to said element.

6. A document stacker for accommodating various size documents comprising:

a document stacking area;

first and second rollers mounted on first and second upright shafts, respectively, at the front of the stacking area;

at least one driven belt carried by said rollers and having a portion extending across a front portion of the stacking area;

a backing member forming the rear wall of said stacker and being movable away from said belt portion to accommodate an increasing number of documents therebetween;

a document entrance toward that end of the stacker front which is nearest the first roller;

means for feeding documents on edge into said entrance;

means urging said backing member toward the stacker front to bias the incoming document into engagement with said belt portion;

a stop member at said stacker front against which the leading edge of each document is driven by said belt portion, said stop member being located, in the direction of document travel, beyond the point of tangency of said belt portion with the second roller;

said stop member being movable in the direction of document travel to accommodate different size documents; and support means for the second shaft constrained to move with said stop member, whereby said second roller and said stop member translate together.

7. A document stacker for accommodating various size documents comprising:

a document stacking area;

first and second rollers mounted on first and second upright shafts, respectively, at the front of the stacking area;

at least one driven belt carried by said rollers and having a portion extending across a front portion of the stacking area;

a backing member forming the rear wall of said stacker and being movable away from said belt position to accommodate an increasing number of documents therebetween;

a document entrance toward that end of the stacker front which is nearest the first roller;

means for feeding documents on edge into said entrance at an acute angle to said backing member;

means urging said backing member toward the stacker front to bias the incoming document into engagement with said belt portion;

a stop member at said stacker front against which the leading edge of each document is driven by said belt portion, said stop member being located, in the direction of document travel, beyond the point of tangency of said belt portion with the second roller;

said stop member being movable in a direction parallel to the stacker front to accommodate different size documents; and support means for the second shaft constrained to move with said stop member, whereby said second roller and said stop member translate together.

8. A document stacker for accommodating various size documents comprising:

a document stacking area;

first and second rollers mounted on first and second upright shafts, respectively, at the front of the stacking area;

at least one driven belt carried by said roller and having a portion extending across a front portion of the stacking area;

a backing member forming the rear wall of said stacker and being movable away from said belt portion to accommodate an increasing number of documents therebetween;

a document entrance toward that end of the stacker front which is nearest the first roller;

means for feeding documents on edge into said entrance;

means urging said backing member toward the stacker front to bias the incoming document into engagement with said belt portion;

a stop member at said stacker front against which the leading edge of each document is driven by said belt portion, said stop member being located, in the direction of document travel, beyond the point of tangency of said belt portion with the second roller;

said stop member being movable in a direction parallel to the stacker front to accommodate different size documents;

support means for the second shaft constrained to move with said stop member, whereby said second roller and said stop member translate together; and means biased against said belt for maintaining substantially constant tension in the belt for any position of said second roller.

9. A document stacker for accommodating various size documents comprising:

a document stacking area;

first and second rollers mounted on first and second upright shafts, respectively, at the front of the stacking area;

at least one driven belt carried by said rollers and having a portion extending across a front portion of the stacking area;

a backing member forming the rear wall of said stacker and being movable away from said belt portion to accommodate an increasing number of documents therebetween;

a document entrance toward that end of the stacker front which is nearest the first roller;

means for feeding documents on edge into said entrance;

means urging said backing member toward the stacker front to bias the incoming document into engagement with said belt portion;

a stop member at said stacker front including a piece of elastomeric material against which the leading edge of each document is driven by said belt portion, said stop member being located, in the direction of document travel, beyond the point of tangency of said belt portion with the second roller;

said stop member being movable in a direction parallel to the stacker front to accommodate different size documents; and support means for the second shaft constrained to move with said stop member, whereby said second roller and said stop member translate together.

10. A document stacker comprising:

a document stacking area;

first and second rollers mounted on first and second upright shafts, respectively, at the front of the stacking area;

at least one driven belt carried by said rollers and having a portion extending across at least a portion of the front of said stacking area and forming at least a portion of the front wall of the stacker;

a document entrance located near the first roller;

means for feeding documents on edge into said entrance and into engagement with said belt portion;

a stop member at said stacker front against which the leading edge of each document is driven by said belt portion, said stop member being located, in the direction of document travel, beyond the point of tangency of said belt portion with the second roller;

said stop member being movable in a direction parallel to the stacker front to accommodate different size documents; and support means for the second shaft constrained to move with said stop member, whereby said second roller and said stop member translate together.

11. A document stacker for accommodating various size documents comprising:
a document stacking area;
first and second rollers mounted on first and second upright shafts, respectively, at the front of the stacking area;
at least one driven belt carried by said rollers and having a portion extending across a front portion of the stacking area;
a backing member forming the rear wall of said stacker and being movable away from said belt portion to accommodate an increasing number of documents therebetween;
a document entrance toward that end of the stacker front which is nearest the first roller;
means for feeding documents on edge into said entrance;
means urging said backing member toward the stacker front to bias the incoming document into engagement with said belt portion;
a stop member at the front of said stacking area against which the leading edge of each document is driven by said belt portion, said stop member being located, in the direction of document travel, beyond the point of tangency of said belt portion with the second roller;
said belt, beyond said point of tangency leaving said stacking area in the region between said point of tangency and the surface portion of said stop member against which the leading edges of the documents are driven;
said stop member being movable in a direction parallel to the front wall of the stacker to accommodate different sized documents; and
support means for the second shaft constrained to move with said stop member, whereby the second roller and the stop member translate together.

12. A document stacker for accommodating various size documents comprising:
a document stacking area;
first and second rollers mounted on first and second upright shafts, respectively, at the front of the stacking area;
at least one driven belt carried by said rollers and having a portion extending across a front portion of the stacking area;
a backing member forming the rear wall of said stacker and being movable away from said belt portion to accommodate an increasing number of documents therebetween;
a document entrance toward that end of the stacker front which is nearest the first roller;
means for feeding documents on edge into said entrance;
means urging said backing member toward the stacker front to bias the incoming document into engagement with said belt portion;
a stop member at the front of said stacking area against which the leading edge of each document is driven by said belt portion, said stop member being located, in the direction of document travel, beyond the point of tangency of said belt portion with the second roller;
said belt, beyond said point of tangency, leaving said stacking area in the region between said point of tangency and the surface portion of said stop member against which the leading edges of the documents are driven;
the forwardmost edge of the stop surface being located forward of the plane of said belt portion, whereby the leading edge of each document contacts the stop surface between the forward and rearward edges thereof;
said stop member being movable in a direction parallel to the front wall of the stacker to accommodate different sized documents; and
support means for the second shaft constrained to move with said stop member, whereby the second roller and the stop member translate together.

References Cited by the Examiner

UNITED STATES PATENTS

| | | | |
|---|---|---|---|
| 3,078,089 | 2/1963 | Maidment | 271—87 X |
| 3,079,151 | 2/1963 | Maidment | 271—87 X |
| 3,139,278 | 6/1964 | Maidment | 271—87 X |
| 3,220,724 | 11/1965 | Von Glahn | 271—87 X |
| 3,220,725 | 11/1965 | Brozo | 271—87 X |

M. HENSON WOOD, JR., *Primary Examiner.*

A. N. KNOWLES, *Assistant Examiner.*